US006469797B2

(12) United States Patent
Sakai

(10) Patent No.: US 6,469,797 B2
(45) Date of Patent: *Oct. 22, 2002

(54) IMAGE CAPTURING APPARATUS

(75) Inventor: Yasumasa Sakai, Yamato (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/286,427

(22) Filed: Apr. 6, 1999

(65) Prior Publication Data

US 2002/0118386 A1 Aug. 29, 2002

(30) Foreign Application Priority Data

Apr. 6, 1998 (JP) .............................. 10-093545

(51) Int. Cl.[7] .............................. G06F 13/00
(52) U.S. Cl. ..................... 358/1.15; 358/1.13
(58) Field of Search ................. 358/1.15, 1.6, 358/1.13

(56) References Cited

U.S. PATENT DOCUMENTS 6,069,707 A * 5/2000 Pekelman .................... 358/1.6
6,272,235 B1 * 8/2001 Bacus et al. ................ 382/133

* cited by examiner

Primary Examiner—Amelia M. Au
Assistant Examiner—Douglas Tran
(74) Attorney, Agent, or Firm—Fitzpatrick, Cella, Harper & Scinto

(57) ABSTRACT

When an image capturing apparatus connected to a LAN, which is connectable a plurality of terminals, transmits image data obtained by reading an image on an original to a desired terminal on the LAN, the read image is confirmed by, e.g., previewing the image using a display device placed in the vicinity of the image capturing apparatus, and is then transmitted to an actual destination. With this control, an image of a desired format can be easily transmitted even from an image capturing apparatus having no satisfactory image display function to a desired destination.

10 Claims, 5 Drawing Sheets

IMAGE CAPTURING APPARATUS

BACKGROUND OF THE INVENTION

1. Field of the Invention

The present invention relates to an image capturing apparatus such as a scanner for reading an image on an original, and its control method.

2. Related Background Art

In recent years, a system in which a scanner for reading an image on an original is connected to a local area network (LAN) or the like to which a plurality of terminals are connected, and image data obtained by the scanner is transferred to remote terminals has been proposed.

In such system, since destination terminals are normally distant from the scanner connected to the network, the scanner must designate the destination.

Normally, since the scanner does not have any display that allows the user to sufficiently confirm an image obtained by reading an original, the user cannot confirm the outline of the overall image, and an image in an unwanted format may be sent or an incomplete image may be transmitted.

It is only after the user at the designated destination outputs the received image data as a visible image that he or she notices that the received image is not a desired one. In order to obtain a desired image, the user at the scanner must repeat operation for reading an image on the original using the scanner.

SUMMARY OF THE INVENTION

It is an object of the present invention to provide an image capturing apparatus and its control method, which are free from the aforementioned problems.

It is another object of the present invention to provide an image capturing apparatus and its control method, which can confirm the read image before the image is transferred to a required destination.

It is still another object of the present invention to provide an image capturing apparatus and its control method, which can confirm an image using a device placed in the neighborhood of the image capturing apparatus, and can then transfer that image data.

The above and other objects of the present invention will become apparent from the following detailed description taken in conjunction with the accompanying drawings.

DETAILED DESCRIPTION OF THE PREFERRED EMBODIMENTS

<System Arrangement>

Figure 1:
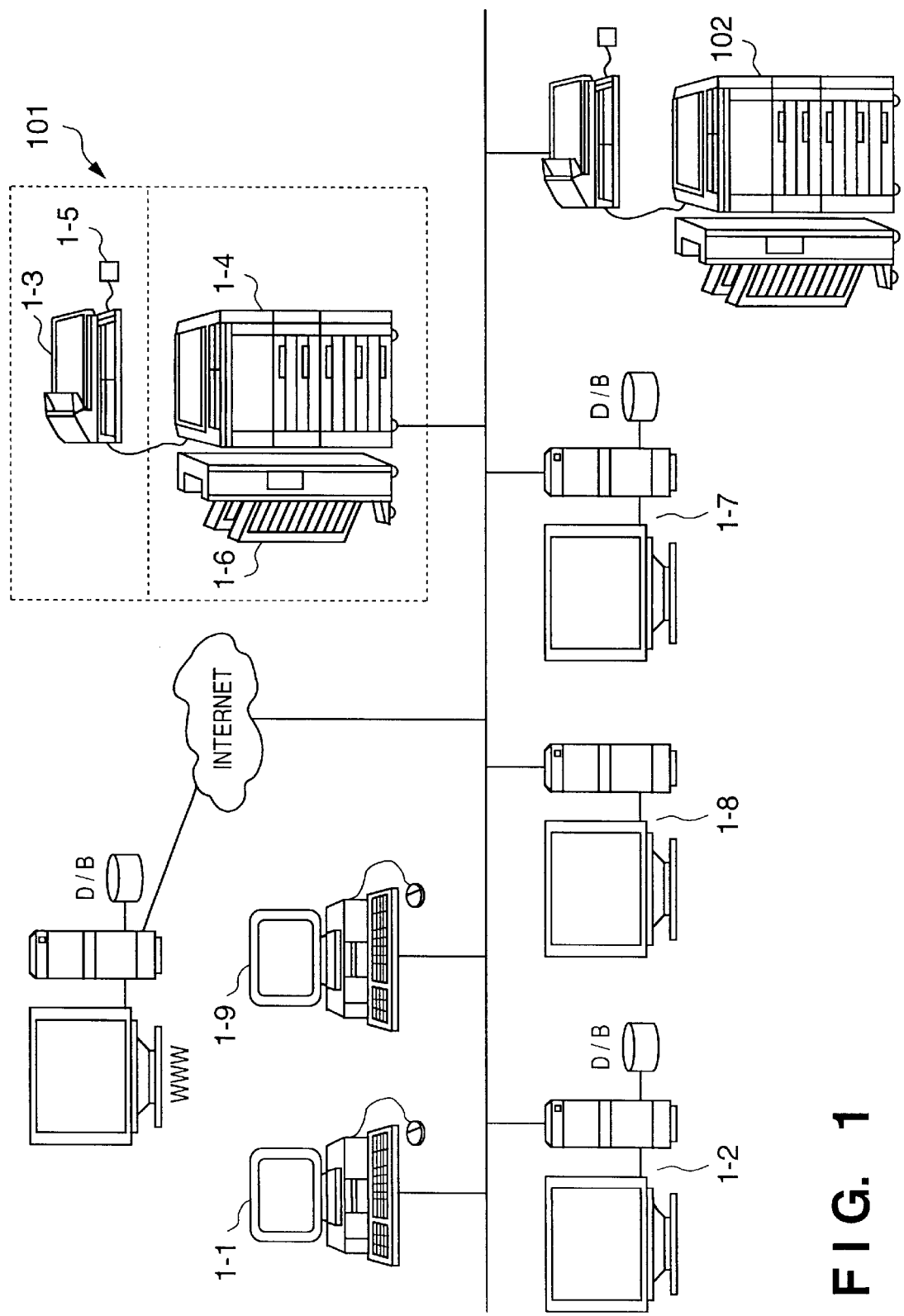
FIG. 1 is a diagram showing a network system to which a digital hybrid machine is connected.

FIG. 1 shows the arrangement of a communication network system to which a digital hybrid machine as an image capturing apparatus according to the present invention is connected. Referring to FIG. 1, a network client 1-1 is composed of a personal computer with a LAN interface, and can use the resources on the network under the control of a network server 1-2, as a client terminal in the network system. The network server 1-2 is comprised of a personal computer or the like, and manages the entire network.

A digital hybrid machine 101 is connected to a LAN together with the network server 1-2 and client 1-1, and comprises a scanner 1-3 for scanning and reading an image on an original, a printer 1-4 for printing an image, a control panel 1-5 as a combination of a touch panel and LCD panel having a resolution and size that can display an image for one A4 original page in a reduced scale, and an accessory 1-6 such as a finisher or the like. Also, a digital hybrid machine 102 has the same arrangement as that of the digital hybrid machine 101.

A groupware server 1-7 manages various applications that share information via the network. A mail server 1-8 is comprised of a workstation or the like, manages exchange of E-mails among terminals such as personal computers and the like connected to the LAN, and controls exchange of E-mails with a terminal connected to a terminal on the LAN via a telephone line (Internet). A terminal 1-9 is composed of a personal computer, a PDA (personal data assistant) or a dedicated terminal, and serves as a browser for browsing data on a server connected via a telephone line or the like.

The individual terminals have LAN interfaces and build an intercommunication environment.

Figure 5:
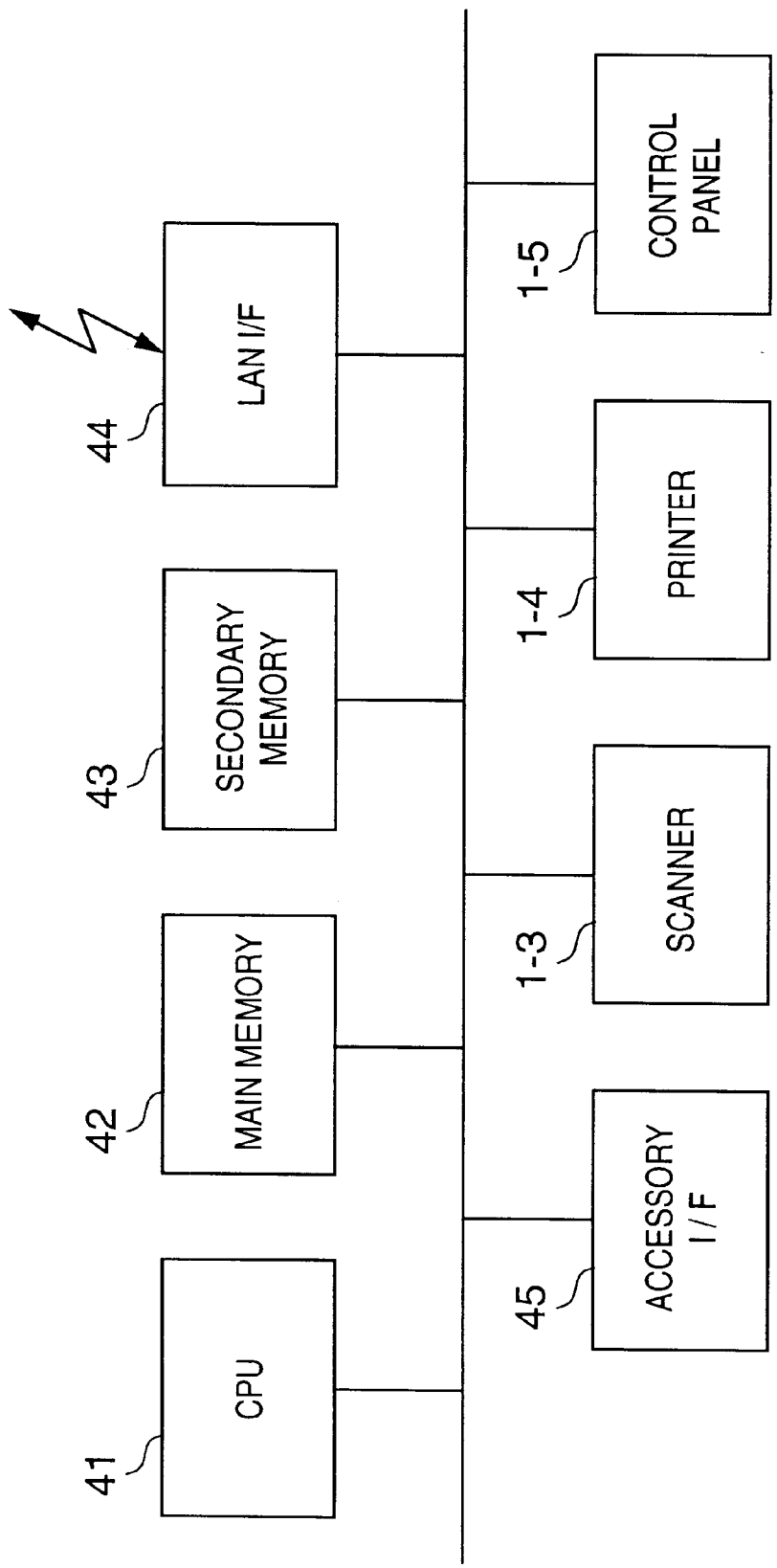
FIG. 5 is a schematic block diagram showing the arrangement of a digital hybrid machine.

FIG. 5 is a block diagram of the digital hybrid machine 101. A CPU 41 controls the entire hybrid machine 101, i.e., controls original scan by the scanner 1-3 and image printout by the printer 1-4, and transmission of image information onto the LAN via a LAN interface 44 by executing a program stored in a main memory 42. A secondary memory 43 is a device such as a hard disk, flexible disk, or the like for storing data files and program files. The accessory 1-6 such as a finisher or the like is attached to an accessory interface 45. The control panel 1-5 is constructed by combining an LCD panel for displaying an image, and a touch panel for making operation inputs, as described above, and can instruct the start of push scan (scan operation from the scanner 1-3 side for the LAN) and can designate an output destination and the like.

Figure 2:
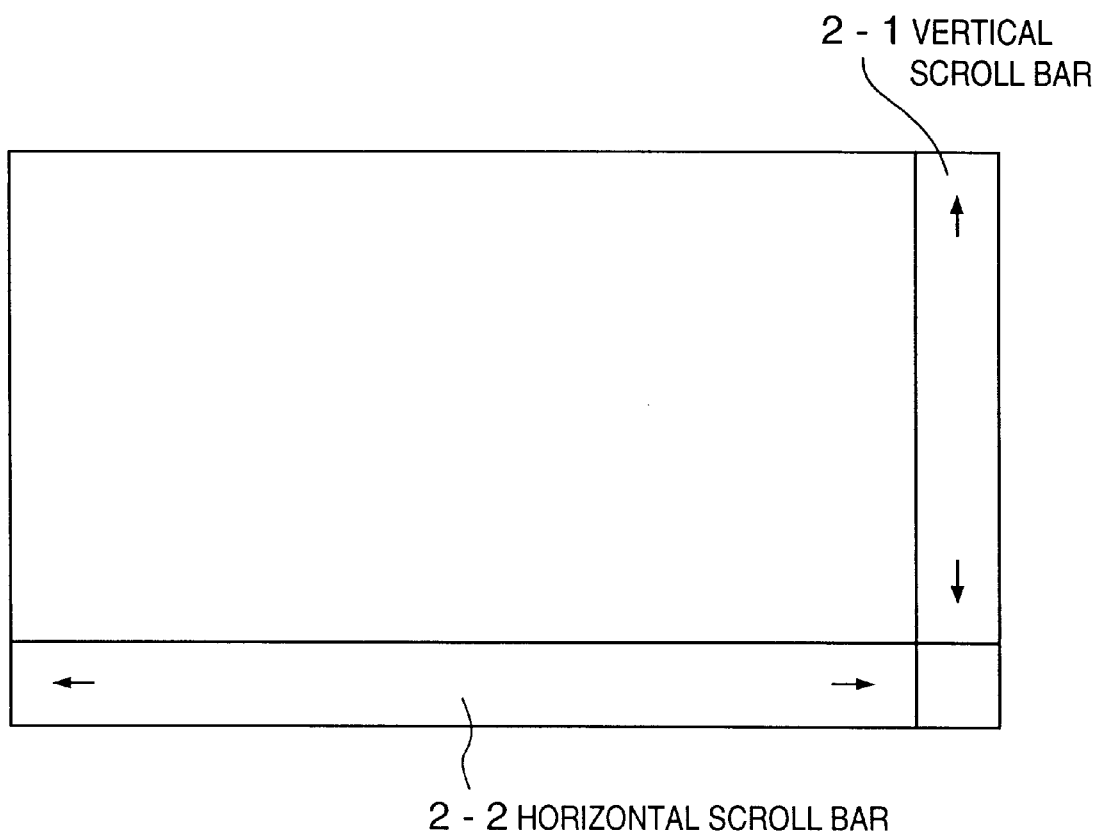
FIG. 2 is an explanatory view of a display example on an LCD display.

FIG. 2 shows an example of the display screen on the LCD panel of the control panel 1-5. FIG. 2 shows a case wherein the image to be displayed exceeds the panel size. In such case, a vertical scroll bar 2-1 is displayed. For example, when the operator presses the upward or downward arrow portion of the vertical scroll bar 2-1, a given portion of the touch panel that overlaps the LCD display is pressed. With this operation, the digital hybrid machine 101 vertically scrolls the frame in the direction of the pressed arrow. A horizontal scroll bar 2-2 is displayed to scroll the frame horizontally. Note that means for designating scrolling may comprise buttons or the like provided to the control panel 1-5 in place of the touch panel integrated with the display. When the image to be displayed falls within the panel size, neither scroll bars nor arrows are displayed.

In this digital hybrid machine 101, an image read by the scanner 1-3 can be output to the printer 1-4 in accordance with an instruction from the control panel 1-5. Also, in accordance with an instruction from the control panel 1-5, an image read by the scanner 1-3 can be sent to another digital hybrid machine connected via the LAN, and can be printed by the printer function of that digital hybrid machine. Furthermore, in accordance with an instruction from the control panel 1-5, an image read by the scanner 1-3 can be sent to another digital hybrid machine connected via the LAN, and can be displayed on the display of the control panel of that hybrid machine. Moreover, in accordance with an instruction from the control panel 1-5, an image read by the scanner 1-3 can be converted into a file, and can be sent to a personal computer connected via the LAN as a file attached to an E-mail. Then, the attached image can be displayed and confirmed using a user interface of a mail application of that personal computer.

<Operation Sequence Upon Push Scan>

Figure 3:
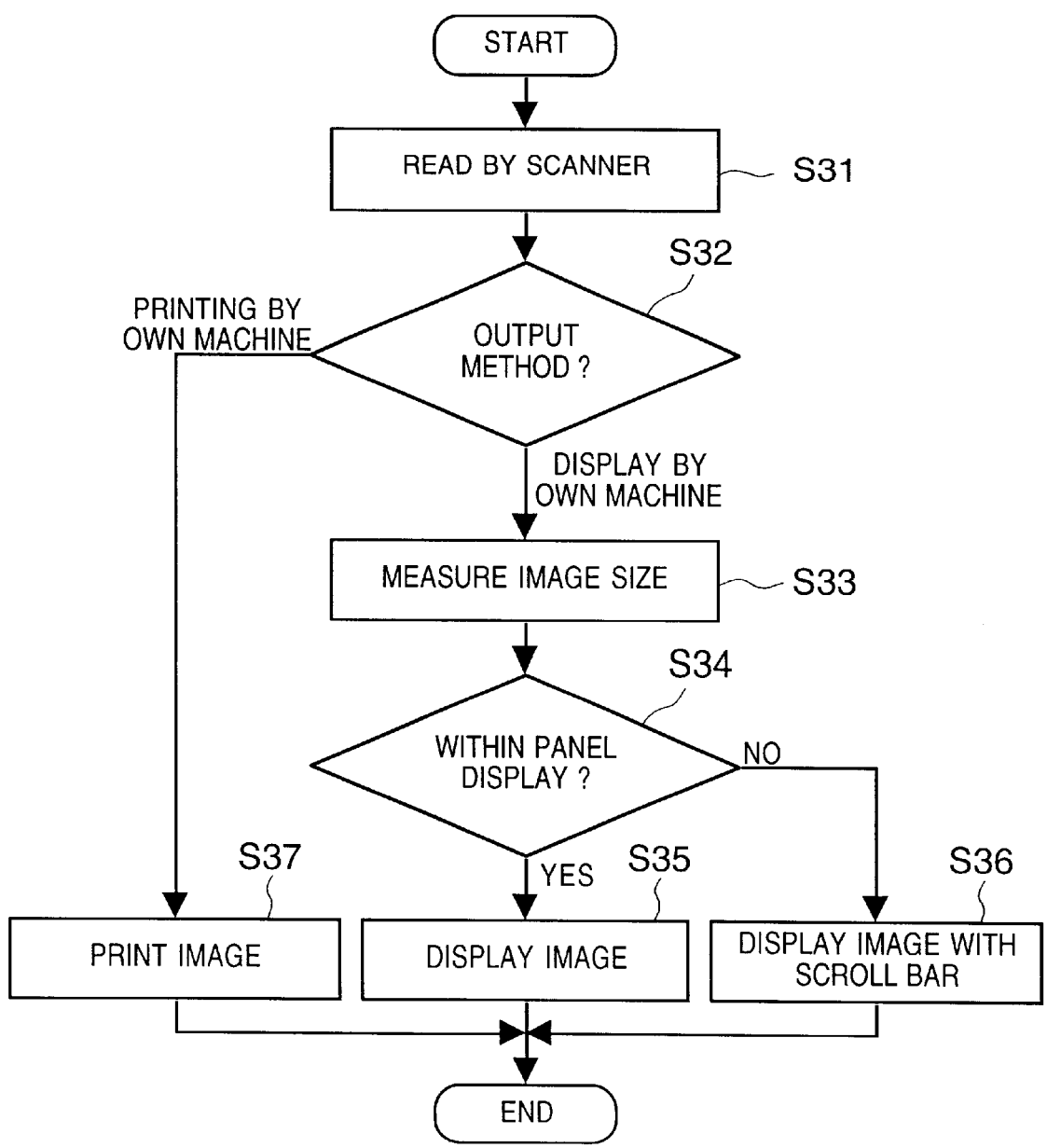
FIGS. 3 and 4 are flow charts showing the control sequence upon push scan.

When a push scan instruction is input from the control panel 1-5 to execute such operation, the digital hybrid machine 101 operates in the sequence shown in FIG. 3. This sequence is implemented when the CPU 41 executes a program in the main memory 42. Upon issuing the push scan instruction, an instruction for displaying the scanned image on the control panel or printing it via the printer before the image is transmitted to the designated destination is simultaneously issued.

When the push scan instruction is input, an image is read by the scanner 1-3 in step S31.

In step S32 it is checked based on the instruction input in advance if the image is displayed or printed. If the instruction for displaying the image on the control panel is input, the flow advances to step S33 to measure the image size. In step S34 it is checked based on the result of step S33 if the scanned image displayed on the LCD panel used in the current control panel 1-5 falls within the display screen, i.e., the entire image can be displayed. If the image can fall within the display screen, the image is displayed on the LCD panel in step S36. If the image falls outside the display screen, the flow advances to step S35 to switch the image display method to image display with scroll bars, and to display the image on the LCD panel.

If it is determined in step S32 that the image is printed out, the flow advances to step S37, and the image is printed by the printer 1-4.

Figure 4:
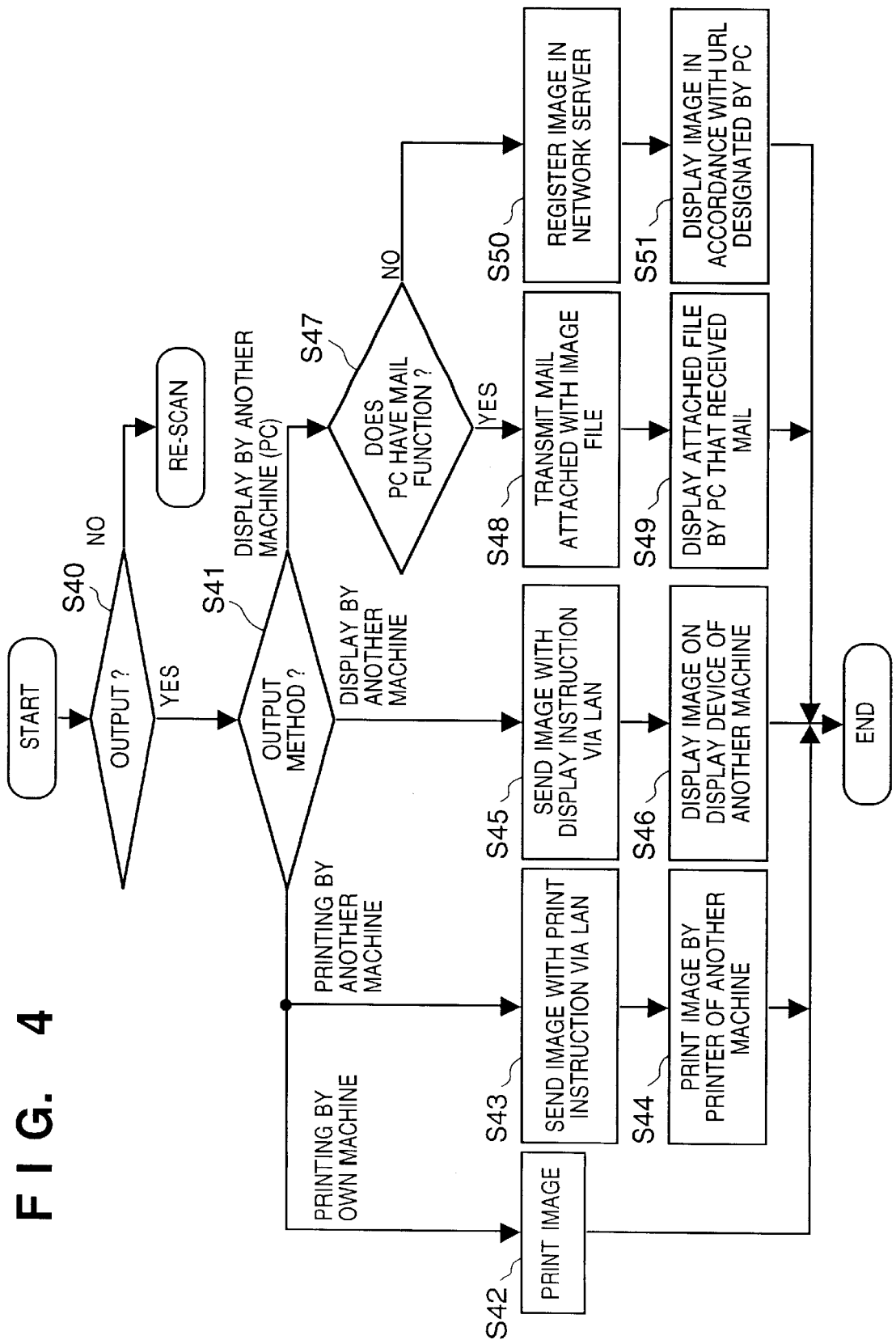

FIG. 4 shows the processing sequence when the scanned image is output in accordance with designation at the control panel 1-5 after the scanned image is displayed on the control panel in step S35 or S36 in FIG. 3. The sequence shown in FIG. 3 is started when the operator designates the output destination and route of an image at the control panel 1-5. This designation is made by displaying a plurality of output methods that can be selected by a menu, and making the operator select one of them.

To attain processing upon outputting the scanned image from another machine, the network address of a nearby digital hybrid machine (e.g., 102) is input to the digital hybrid machine 101 in advance by operating the control panel 1-5, and is registered in the secondary memory 43.

Also, to attain processing upon displaying the scanned image on a nearby PC, a mail address accessible from that PC is input to and registered in the secondary memory 43 by operating the control panel 1-5.

When the nearby PC is connected to the LAN but cannot access the mail server 1-8 and has a web browser, the network address and a URL for image display of the network server 1-2 are registered.

Upon registering such information, symbols are set in correspondence with the distances and directions from the digital hybrid machine 101, so that the operator can easily determine the locations of the individual machines.

The flow of the processing upon confirmation displaying (previewing) the scanned image will be explained below with reference to FIG. 4.

It is checked in step S40 if it is instructed to output the image for confirmation. If the image is not output, image scan is resumed by repeating the sequence shown in FIG. 3.

On the other hand, if the image is output, the selected output method is checked in step S41.

If printing by the own machine is selected, the scanned image is printed by the printer 1-4 in step S42.

If printing by another digital hybrid machine (e.g., 102) registered in advance is selected, information indicating the location of that machine is displayed on the control panel 1-5, the image read by the scanner 1-3 is converted into a file, and that file appended with a predetermined print instruction is transmitted to the other digital hybrid machine 102 connected via the LAN in step S43. Upon receiving the image file and print instruction, the other digital hybrid machine 102 prints the image by its printer in step S44.

In the digital hybrid machine 102, a program for monitoring its own LAN port is always running as a background. This program performs the following operation in response to an interrupt at the port.

If it is determined that an interrupt at the port upon receiving data from the LAN is a print request, image data based on the original image scanned by the scanner 1-3, which follows the print request, is received, and is subjected to image processing such as expansion or the like as needed. Then, the image is printed.

On the other hand, if display by another digital hybrid machine (e.g., 102) registered in advance is selected, information indicating the location of that machine is displayed on the control panel 1-5, the image read by the scanner 1-3 is converted into a file, and that file appended with a predetermined display instruction is transmitted to the other digital hybrid machine 102 connected via the LAN in step S45. Upon receiving the image file and print instruction, the other digital hybrid machine 102 displays the image on the LCD display of its control panel in step S46, as in printing mentioned above.

If display using a personal computer (PC) registered in advance is selected, the location of the PC is displayed on the control panel 1-5.

It is then checked in step S47 if the PC which is to display the image can access the mail server 1-8 and has a function of receiving an E-mail.

If YES in step S47, the flow advances to step S48. In step S48, image data based on an image on an original scanned by the scanner 1-3 is converted into a file of a predetermined format (e.g., JPEG), and an E-mail attached with that file is sent to the mail address registered in advance.

Upon receiving this mail, the PC displays the image file attached to the mail on its display as a visible image in step S49.

On the other hand, if NO in step S47, since the PC registered in advance has a web browser, a URL for image display is displayed on the control panel 1-5, and the flow advances to step S50.

In step S50, image data based on an image on an original scanned by the scanner 1-3 is converted into a file of a predetermined format (e.g., JPEG), that file is edited to obtain an HTML file (an HTML file with an image), and the HTML file is registered in a predetermined area of the network server 1-2.

In step S51, a PC which has been registered to display an image using the web browser is connected to the network server 1-2 using the URL displayed on the digital hybrid machine to browse the HTML file on its display, thereby visually displaying the image.

Note that the image file may be edited by the network server 1-2 to obtain an HTML file.

Also, after the HTML file is formed by the network server 1-2, URL information may be transmitted from the network server 1-2 to the digital hybrid machine 101, and may be displayed on that machine.

If the operator determines that the printed or displayed image suffers disturbance or omissions, that image can be scanned again, and can be output in the same sequence as described above.

After the operator confirms the output image, he or she designates an actual output destination of that image (or designates it in advance), and sends the image to that destination.

An instruction for granting transmission to the actual output destination may be issued from either the machine which output the image for confirmation or the digital hybrid machine which scanned the image.

As described above, upon executing so-called push scan for transmitting image data read by the scanner of one digital hybrid machine to another apparatus connected via the network, the image data to be transmitted is temporarily displayed by the digital hybrid machine which scanned the image or a terminal designated by the operator, and after that, the image data is transmitted to a database, terminal or the like as an actual destination. Hence, the scanned image can be confirmed before transmission. More specifically, the scanned image data is output first from the designated output device in the neighborhood of the operator so as to allow the operator to confirm it. Then, the scanned image is output to the actual output destination, thus preventing wrong data suffering image omissions or the like from being output.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

The present invention has been explained by way of its preferred embodiment. However, the present invention is not limited to the above embodiment, and various changes and modifications may be made within the scope of the appended claims.

What is claimed is:

1. An image capturing apparatus comprising:

reading means for reading an image on an original and generating image data based on the image;

connection means for connecting with a network that is connectable to a plurality of terminals;

transmitting means for transmitting the image data from said reading means to a designated destination through said connection means;

registering means for registering a preview method, including an address of a preview device from a plurality of addresses, which can be utilized to display the image data from said reading means before said transmitting means transmits the image data to the designated destination, wherein the plurality of addresses are utilized to transmit the image data in accordance with respective corresponding protocols; and control means for controlling said transmitting means such that the image data from said reading means is transmitted to the designated destination after the image data is previewed by the preview method registered by said registering means.

2. An apparatus according to claim 1, wherein the preview method registered by said registering means includes a method of displaying an image based on the image data on a display device connected via said connection means.

3. An apparatus according to claim 2, wherein said registering means stores an address of the display device to transfer the image data to the display device and make the display device display the image based on the image data.

4. An apparatus according to claim 2, wherein said registering means stores a mail address of the display device to transmit an E-mail attached to the image data and to make the display device display an image based on the attached image data.

5. An apparatus according to claim 2, wherein said registering means stores information for browsing an image based on the image data using a terminal connected to said connection means to make the terminal browse the image using a web-browser.

6. An apparatus according to claim 5, wherein the information stored by said registering means includes a URL indicating a storage location of the image data.

7. An apparatus according to claim 1, wherein said transmitting means transmits the image data to a destination designated by an operator.

8. A control method of an image capturing apparatus, said method comprising:

a reading step of reading an image on an original and generating image data based on the image;

a transmitting step of transmitting the image data generated in said reading step to a designated destination of one of a plurality of terminals connected to the image capturing apparatus;

a registering step of registering a preview method, including an address of a preview device from a plurality of addresses, which can be utilized to display the image data generated in said reading step before the image data is transmitted to the designated destination in said transmitting step, wherein the plurality of addresses are utilized to transmit the image data in accordance with respective corresponding protocols; and a control step of controlling preview of the image data generated in said reading step in accordance with the preview method registered in said registering step, and then to transmit the image data to the designated destination in said transmitting step.

9. A computer-readable storage medium storing a program for implementing a method for controlling an image capturing apparatus, the program comprising:

code for a reading step of reading an image on an original and generating image data based on the image;

code for a transmitting step of transmitting the image data generated in the reading step to a designated destination of one of a plurality of terminals connected to the image capturing apparatus;

code for a registering step of registering a preview method, including an address of a preview device from a plurality of addresses, which can be utilized to display the image data generated in the reading step before the image data is transmitted to the designated destination in the transmitting step, wherein the plurality of addresses are utilized to transmit the image data in accordance with respective corresponding protocols; and code for a control step of controlling preview of the image data generated in the reading step in accordance with the preview method registered in the registering step, and then transmitting the image data to the designated destination in the transmitting step.

10. An image capturing apparatus connected to a plurality of terminals via a network, said apparatus comprising:

an image reader, arranged to read an original image and generate image data based on the image.

a transmitter, arranged to transmit the image data generated by said image reader to a terminal designated from the plurality of terminals;

a registration unit, arranged to register a preview method, including an address of a preview device from a plurality of addresses, which can be utilized to display the image data generated by said image reader before said transmitter transmits the image data to the designated terminal, wherein the plurality of addresses are utilized to transmit the image data in accordance with respective corresponding protocols; and a controller, arranged to control said transmitter such that the image data generated by said image reader is transmitted to the designated terminal after the image data is previewed by the preview method registered by said registration unit.

* * * * *

UNITED STATES PATENT AND TRADEMARK OFFICE
CERTIFICATE OF CORRECTION

PATENT NO. : 6,469,797 B2
DATED : October 22, 2002
INVENTOR(S) : Yasumasa Sakai

It is certified that error appears in the above-identified patent and that said Letters Patent is hereby corrected as shown below:

Title page,
Item [57], ABSTRACT,
Line 2, "connectable" should read -- connectable to --.

Column 1,
Line 15, "such" should read -- such a --.

Column 2,
Line 44, "such" should read -- such a --.

Column 4,
Line 1, "the" (first occurrence) should read -- its --.

Column 5,
Line 10, "output" should read -- outputted --.

Column 8,
Line 2, "image." should read -- image; --.

Signed and Sealed this

Eighteenth Day of March, 2003

JAMES E. ROGAN
*Director of the United States Patent and Trademark Office*